United States Patent [19]

Olson et al.

[11] 4,044,218

[45] Aug. 23, 1977

[54] DIMENSIONALLY STABLE ANODE AND METHOD AND APPARATUS FOR FORMING THE SAME

[75] Inventors: Richard O. Olson, Parma; Gerald R. Pohto, Mentor, both of Ohio

[73] Assignee: Diamond Shamrock Corporation, Cleveland, Ohio

[21] Appl. No.: 719,820

[22] Filed: Sept. 2, 1976

Related U.S. Application Data

[62] Division of Ser. No. 514,143, Oct. 11, 1974, Pat. No. 3,981,790, which is a division of Ser. No. 368,843, June 11, 1973, Pat. No. 3,895,210.

[51] Int. Cl.² .............................................. B23K 11/10
[52] U.S. Cl. ........................................ 219/91; 29/628; 219/87; 228/179; 228/212
[58] Field of Search ................. 29/624, 628; 228/178, 228/179, 184, 212, 233, 234; 219/87, 91; 204/284, 286, 288

[56] References Cited

U.S. PATENT DOCUMENTS

| 3,139,504 | 6/1964 | Ramstein et al. | 219/87 X |
|---|---|---|---|
| 3,270,180 | 8/1966 | Morley et al. | 219/83 X |
| 3,661,757 | 5/1972 | McLean | 204/290 F |
| 3,674,676 | 7/1972 | Fogelman | 204/288 X |

*Primary Examiner*—Carl E. Hall
*Attorney, Agent, or Firm*—Timothy E. Tinkler

[57] ABSTRACT

The specification and drawings disclose an anode for use in electrolytic cells, as well as a method and apparatus for forming the same. The anode is characterized in that its anode surfaces are formed from two sheets of metal having the same configuration and joined to an anode riser such that all weld joints are symmetrically located relative to the axis of the riser. The disclosed method involves a sequence of clamping all components during welding and maintains the various surfaces planar to eliminate warpage. The disclosed apparatus permits the various steps of the method to be carried out simply and rapidly.

6 Claims, 14 Drawing Figures

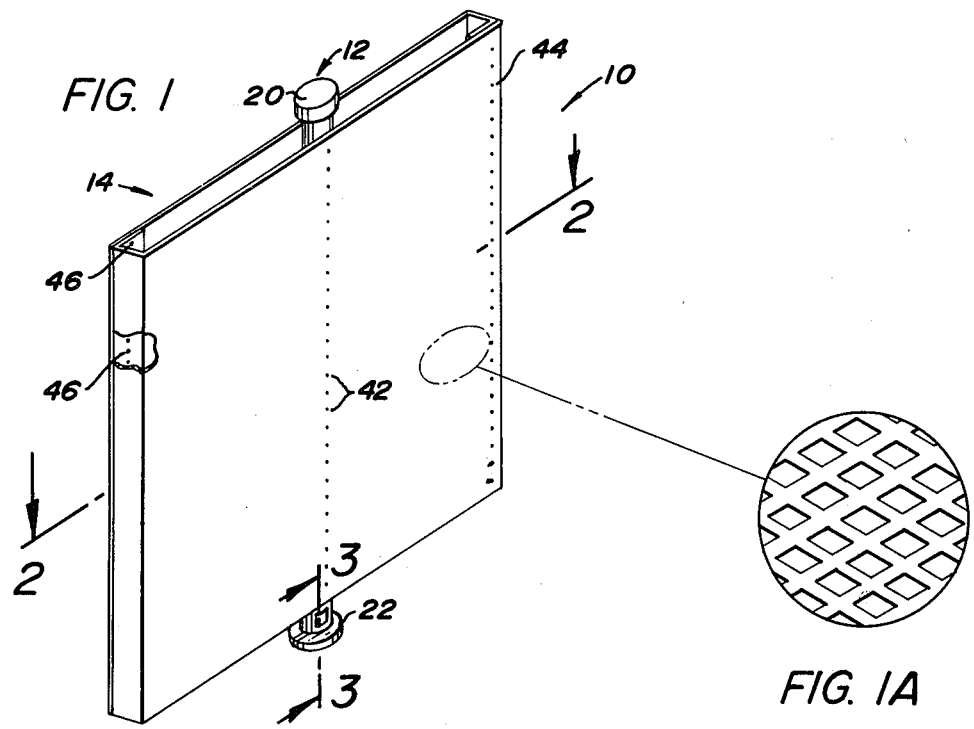
FIG. 1
FIG. 1A
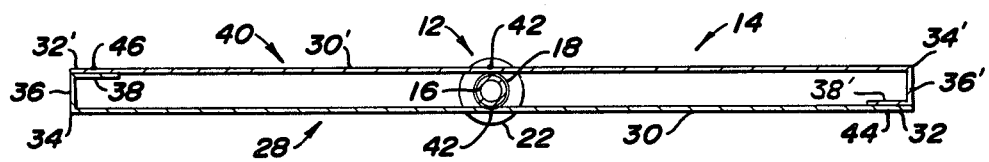
FIG. 2
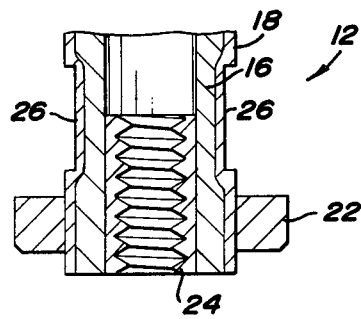
FIG. 3

DIMENSIONALLY STABLE ANODE AND METHOD AND APPARATUS FOR FORMING THE SAME

This is a division of application Ser. No. 514,143, filed Oct. 11, 1974, now U.S. Pat. No. 3,981,790, which in turn is a division of application Ser. No. 368,843, filed June 11, 1973, now U.S. Pat. No. 3,895,210.

BACKGROUND OF THE INVENTION

The subject invention is directed toward the art of electrolytic cells, especially alkali metal chlorate or hypochlorite and diaphragm-type chlor-alkali cells and, more particularly, to an anode assembly for use in such cells and a method and apparatus for forming the same.

Cells used for electrolysis of alkali metal halide brines usually employ a perforated metallic cathode. In chlor-alkali cells, a fluid-permeable diaphragm overlies the cathode and permits hydraulic flow of electrolyte from the anode chamber through the diaphragm and cathode into the cathode chamber.

Somewhat recently, dimensionally stable anodes have been developed for use in these cells. For example, U.S. Pat. No. 3,591,483 to Richard E. Loftfield and Henry W. Laub describes several embodiments of dimensionally stable anodes and methods and apparatus for efficiently and simply mounting the anodes.

In general, the anodes described in the noted patent normally comprise an anode riser or conductor bar which supports members having an extended electrically conductive surface. The surface can comprise any of several materials which have a sufficiently low chlorine overvoltage and which are chemically inert to the electrolyte and resistant to the corrosive conditions in the cell. The many possible materials which can form the electrically conductive surface are discussed at length in the patent but, typically, comprise alloys of platinum group metals, oxides thereof, and mixtures of the metals and oxides.

The electrically conductive surface is normally supported from a sheet or member of a valve metal or alloy thereof; e.g., a film-forming metal such as titanium, tantalum, zirconium, niobium and the like. In current commercial embodiments, the electrically conductive surface is supported on perforated or foraminous sheets, expanded metal of titanium. Typically, two of the sheets are joined in parallel on opposite sides of the anode riser. The anode riser itself is normally a titanium-clad copper electrode. In an attampt to maintain parallelism and flatness of the sheets, as well as to insure structural rigidity and integrity, various types of cross braces and the like have been joined between the sheets. Generally, the components making up the anode assembly, including the braces, are joined by welding.

In order for the anode assembly to function satisfactory, it must have certain mechanical-structural characteristics in addition to the chemical and electrical characteristics discussed in the aforementioned patent. For example, the sheets supporting the electrically conductive surface must have a high degree of flatness. And, the flatness must be maintained throughout extended periods of operation. This is required because irregularities in the surface vary the spacing between the anode assembly and the associated cathode assemblies result in variations in current flow and reductions in the overall efficiency of the cell. Closely associated with the surface flatness requirement is the necessity for extreme parallelism and uniformity of spacing between the sheets of the anode assembly. Variations in these parameters have the same general effect on cell performance as lack of flatness.

In addition to the required dimensional uniformity, the joints and/or bonds between the various components must exhibit uniform electrical conductivity as well as structural strength. This has best been achieved by joining the components with a series of closely-spaced spot welds. However, the difficulties encountered in welding the assemblies have been substantial. First, titanium is inherently difficult to weld. Secondly, the presence of the electrically conductive surface of oxides greatly increases the welding difficulties. Moreover, the welding operation itself tends to result in warpage in the assembly. Consequently, the assembly must be straightened following the welding. In most instances, this has been a time-consuming manual operation.

The addition of internal braces or cross members between the sheets in an attempt to reduce the warpage problem merely produced further manufacturing problems with little or no lessening of warpage or mechanical distortion problems.

Brief Statement of the Invention

The subject invention provides a dimensionally stable anode assembly and method and apparatus for forming the same which overcomes the above-discussed problems.

In general, the preferred anode assembly comprises at least one generally cylindrical anode riser member having a pair of metal sheets, typically foraminous, joined to generally diametrically opposite sides thereof. Each sheet has a major, generally planar, extent with first and second spaced edge portions with each joined to the riser member such that their respective planar extents are parallel and the first edge portion of each is generally parallel to and aligned with the second edge portion of the other. The second edge portion of each sheet is bent to have an integral leg portion extending generally toward the first edge portion of the other sheet. Each leg portion terminates in a flange extending parallel to the first edge portion of the second sheet and joined thereto.

Preferably, and in accordance with a more limited aspect of the invention, the flange portions are joined to first edge of the associated sheet by a closely-spaced series of spot welds. Additionally, the sheets are preferably also joined to the riser by a similar series of spot welds.

There are several advantages obtained from the described construction of the anode assembly. First, only two different major components are required for its construction. That is, the riser and the formed sheets. Because of the arrangement, the two formed sheets can have an identical shape. Secondly, the assembly can be made with all weld lines or spots located symmetrically about all planes which contain the axis of the riser. It is believed that this tends to reduce or eliminate warpage encountered following welding of prior designs. Thirdly, reconditioning of the assemblies (i.e., cleaning and applying a new electrically conductive surface to the assembly) is substantially simpler because the unit does not require internal braces, reverse bends or unusual joints. Additionally, the absence of internal cross members or the like is believed to make it easier to hold the required surface flatness, as well as making it easier to return the assembly to its proper dimensional relationships following misuse or damage during use.

In addition to the structural and manufacturing advantages discussed above, the structural arrangement permits the use of an improved method of fabricating the assemblies. According to a further aspect of the invention, the preferred method includes the steps of:

a. positioning the pair of sheets and the riser member in the relative relationship described above;

b. placing rigid platen members within the assembly to extend between the planar extents of the two sheets and between the leg portions and the riser;

c. clamping the assembly between rigid, planar, external platens positioned to leave exposed those portions of the assembly which are to be joined; and, thereafter, d. joining the sheets to the riser, and the second edge portion of each sheet to the first edge of the other sheet by welding.

Preferably, the welding is accomplished by progressively spot welding a closely and relatively uniformly-spaced series of points along the assembly and parallel to the riser. Additionally, it is preferred that the leg portions also be clamped or otherwise rigidly held throughout their length during welding.

It has been found that by having the assembled components nearly totally enclosed by clamping platens with substantially all surfaces rigidly held in position throughout the welding operation, the resulting structure has a higher degree of flatness and parallelism than was previously obtainable.

A further aspect of the subject invention concerns apparatus particularly suited for carrying out the noted method. In general, apparatus of the type contemplated includes a clamping platen assembly comprising three platen units. Each platen unit comprises two platen members spaced by a longitudinally-extending groove which extends completely through the respective unit. The three units are mounted in juxtaposed, stacked relationship with their longitudinal grooves in alignment. The mounting means include means which permit the platen units to be moved between a first clamping position and a second spaced position for loading and removal of the assembly and components.

The platen units are sized so that the major areas of the sheets of the anode assemblies are engaged and clamped while the joint areas are exposed for welding. The intermediate platen unit is arranged so that the anode riser is closely received in the longitudinal groove with the platen members of the intermediate unit substantially completely filling the space between the anode riser and the leg portions of the sheets.

Preferably, and in accordance with a more limited aspect, the platen members making up the intermediate plate unit preferably include movable clamp bars which can be actuated laterally to clamp the leg portions of the sheets against fixed stops associated with the platen assembly. These clamp bars determine the width and lateral contour of the assembly and, with this arrangement, all portions of the anode assembly are rigidly held during the welding operation.

Desirably, the clamping platen assembly is associated with three sets of spot welding electrodes so that upon indexed, relative movement between the electrode and the platen assembly in a direction longitudinally of the assembly, all weld joints will be made somewhat simultaneously by providing relative movement between the electrodes and the assembly. Preferably, and in accordance with the preferred embodiment, the platen assembly is carried by means which index it past the welding electrodes. The electrodes are, of course, mounted for movement toward and away from the platen assembly in timed relationship with the index movement.

An additional aspect of the invention concerns the operating parameters for the spot welding electrodes for obtaining a high-quality weld on the oxide-coated titanium. The difficulties are overcome by a desired relationship between time, temperature or current, and pressure. This relationship will be discussed at some length in the detailed description of the invention.

Briefly, it has been found that these parameters are somewhat critical if satisfactory welds are to be obtained. In order to obtain the close and constant current level required, the spot welding electrodes are fired sequentially so that only one is fired at any one point in time. Moreover, the contact pressure between the electrodes and the components is maintained somewhat higher than would be expected.

Objects of the Invention

A primary object of the invention is the provision of a dimensionally stable anode construction which can be manufactured to required dimensional tolerances easier than prior art constructions.

Another object is the provision of an anode construction which uses a minimum number of components to achieve a structure in which the joints are symmetrically located relative to the center axis of the anode.

Still another object is the provision of method and apparatus by which anodes of the type discussed can be produced with substantial structural integrity.

A further object is the provision of a method and apparatus for forming anodes of the type described which overcomes problems previously encountered with respect to warpage and dimensional tolerance variations.

Yet another object is the provision of an apparatus for totally enclosing and clamping all major components of the anode assembly during the welding.

A further object is the provision of a method and apparatus wherein all planar surfaces of the anode assembly are maintained rigidly in position throughout the welding operation.

BRIEF DESCRIPTION OF THE DRAWINGS

The above and other objects and advantages will become apparent from the following description when read in conjunction with the accompanying drawings wherein:

FIG. 1 is a pictorial view of an anode assembly formed in accordance with the subject invention;

FIG. 1A is an enlarged view of the circled area of FIG. 1 showing the perforated sheet members used for forming the anode of FIG. 1;

FIG. 2 is a cross-sectional view taken on line 2—2 of FIG. 1;

FIG. 3 is a cross-sectional view taken on line 3—3 of FIG. 1;

Detailed Description of the Drawings

Figure 4A:
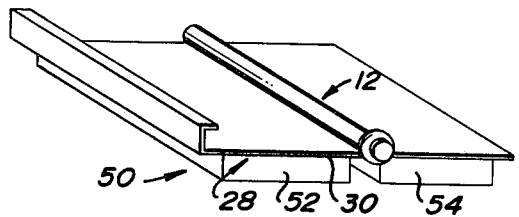
FIGS. 4A-4D show the preferred sequence of steps used for forming the anode assembly of FIGS. 1-3.
Figure 4B:
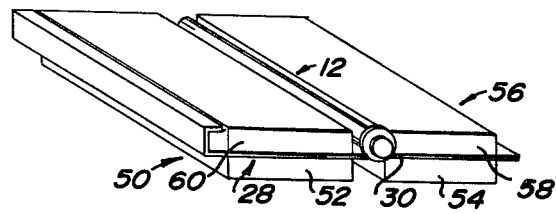

Referring more particularly to the drawings wherein the showings are for the purpose of illustrating a preferred embodiment of the invention only, and not for the purpose of limiting same, FIG. 1 shows the overall arrangement of an anode assembly 10 of the general type described in U.S. Pat. No. 3,591,483 to Loftfield et al. In the subject embodiment, the anode assembly is shown as comprising an anode riser member 12 which carries and supports metal sheets which carry anode surfaces 14. The anode riser 12 comprises a generally cylindrical member having a conductor core 16 formed from a copper tube (see FIGS. 2 and 3) which has a titanium cover 18 clad or otherwise applied to the tube. It should be appreciated that the materials from which the assembly is constructed could vary. The above-mentioned patent suggests several material combinations which have been found to be suitable. However, titanium is preferred. The upper end of the riser member 12 is closed by a titanium cap member 20 welded or otherwise sealingly joined thereto. The cap member 20 serves to totally enclose and seal the copper core 16 at the upper end. Positioned about the lower end of the riser 12 is a mounting flange 22. Flange 22 is formed from a titanium alloy and permits the unit to be suitably mounted to a base member not shown but described in the aforementioned patent. Additionally, a threaded copper insert 24 is received in the lower end of riser 12 to provide a means for connecting the assembly to a base. Additionally, but not of particular importance to the subject invention, the lower end portion of the riser 12 is provided with wrench flats 26 to facilitate installation and removal of the assembly.

Of relative importance to the subject invention is the overall construction and arrangement of the anode sheets and their relationship to the riser 12. As noted above, the anode sheets could be formed from many different materials and have a variety of different types of electrically conductive surfaces carried thereon; however, in the subject embodiment, the anode surfaces 14 are supported by foraminous titanium sheets, specifically sheets of .070 inch titanium metal expanded or perforated to form a mesh-like sheet best illustrated in FIG. 1A. Although the total open area could vary, in the subject embodiment, approximately one-half of the total sheet area is open as illustrated in FIG. 1A. Additionally, although not shown in FIG. 1, the sheets which carry the anode surface 14 are preferably uniformly perforated or open throughout their entire area.

In the embodiment shown, the anode surfaces 14 are carried by two of the perforated or expanded metal sheets which have an identical configuration best illustrated in FIG. 2. Note that a first sheet 28 includes a first major planar portion 30 having a first end portion 32 and a second end portion 34. The second end portion 34 has formed integrally therewith a short, bent leg 36. The length of leg 36 is substantially equal to the outside diameter of the anode riser 12. At the other end of leg 36, a continuous tab or flange portion 38 is bent to extend generally parallel to the surface of portion 30. A second sheet member 40 is formed identically to sheet member 28. It includes a first major planar portion 30' having a first end 32' and a second end 34'. A leg portion 36' extends from end portion 34' and terminates in a flange 38'.

The sheets 28 and 40 are positioned adjacent the exterior of the anode riser 12 on diametrically opposite sides thereof. The major extents 30 and 30' of the sheets 28 and 40 extend parallel to each other and are joined to the riser 12 by rows of spot welding 42. As shown, the first ends 32, 32' of each sheet are parallel with and joined to the respective tab portions 38 and 38' of the second ends 34 and 34'. Likewise, the ends are joined by separate series of spot welds 44 and 46. Preferably, the spot welds are located relatively uniform distances apart and a sufficient number are provided to join at least half or every other one of the individual strands of the mesh or expanded sheet to the anode riser or the adjacent sheet.

As discussed earlier, it has been found that anode assemblies, when constructed as described, can be maintained to a higher degree of flatness and within relatively rigid tolerance limitations. It is believed that this results from the symmetry of the assembly about any plane which includes the axis of the anode riser 12. Note that all weld joint lines are symmetrically located relative to one another. Additionally, a minimum number of components sufficient to provide this symmetry are utilized, and no internal cross braces or the like are positioned within the unit as has been attempted in certain prior art structures. Of course, if desirable, in large anodes some braces could be added. An additional advantage present with the subject structure is that it is simpler and easier to recondition; i.e., applying a new oxide coating to the exterior surfaces of the anode sheets.

Figure 4C:
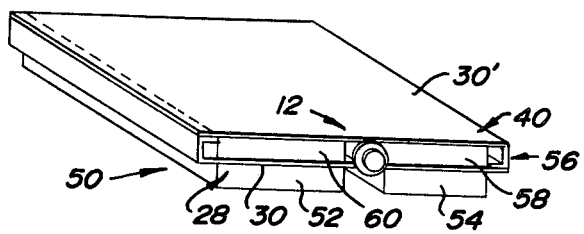

FIGS. 4A-4D illustrate a preferred sequence of steps which can be used for forming the anode assembly of FIGS. 1-3. In general, as shown in FIG. 4A, the sequence begins by positioning a first sheet 28 on a rigid, flat surface such as platen unit 50 having two platen members 52 and 54 positioned and sized so as to engage substantially all portions of surface 30 except those areas required to be exposed for the welding operation. The anode riser 12 is placed over the sheet 28 in its desired location and suitably supported and held in location. Thereafter, as illustrated in FIG. 4C, the second sheet 40 is positioned over the sheet 28 and the anode riser 12. Either prior or subsequent to the location of sheet 40, a second platen unit 56 including relatively rigid, flat platen members 58 and 60 is positioned so as to substantially fill the spaces between the sheets 28 and 40 (see FIG. 4B).

Figure 4D:
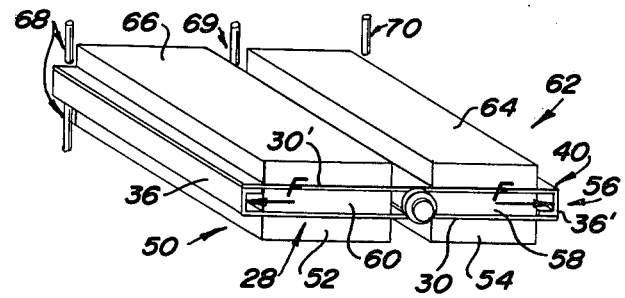

Subsequent to the positioning of the sheets and the anode riser, a third platen unit 62 is moved into position against surface 30' of sheet 40. Platen unit 62 similarly includes two platen members 64 and 66 sized and located so as to engage substantially the entire surface 30' except for those areas which must be exposed for performing the welding operation. FIG. 4D illustrates an additional step which is preferred prior to the welding operation. Namely, the application of a clamping force F to the leg portions 36 and 36' to move them against fixed stops and hold them throughout the welding operation. With all of the platen assemblies clampingly engaging the various surface portions of the anode assembly, the spot welding can be accomplished by producing indexed relative movement between the platen assembly and three sets of spot welding electrodes 68, 69 and 70. Preferably, the welding electrodes 68-70 are located in alignment and are operated so that all three rows of spot welding are accomplished simultaneously or nearly simultaneously.

As is apparent, the above-described operation could be carried out with clamping assemblies of various types. Additionally, the welding could be performed with different electrode arrangements or with different forms of relative movement between the electrodes and the platen assembly. However, FIGS. 5-10 illustrate the preferred form of welding and platen assembly 71 formed according to the subject invention. Reference numerals corresponding to those used in discussing FIGS. 4A-4D have been used to identify the major components. The overall arrangement of the preferred form of platen assembly 71 can best be seen by reference to FIG. 6. Broadly, it includes a lower or first platen unit 50, an intermediate or second platen unit 56, and an upper or third platen unit 62. The lower platen unit 50 is defined by a single, relatively rigid metal plate 72 provided with longitudinally-extending through grooves or recesses 73-75. The recesses 73-75 effectively divide the plate 72 into two platen members 52 and 54. It should be realized that the recesses 73-75 also leave exposed those portions of the sheet 28 which are to be engaged by the lower electrodes of the welding electrode sets 68-70. Additionally, as will subsequently become apparent, the plate 72 serves as the base or support for the two upper platen units 56 and 62. Positioned on the plate 72 are suitable wear plates 76 and 77 sized so as to engage the major portions of the surface 30 except for the exposed areas subject to welding. Carried on plate 72 and connected thereto at its opposite ends are suitable locating blocks 80 and 82 which position the anode riser member 12.

Figure 6:
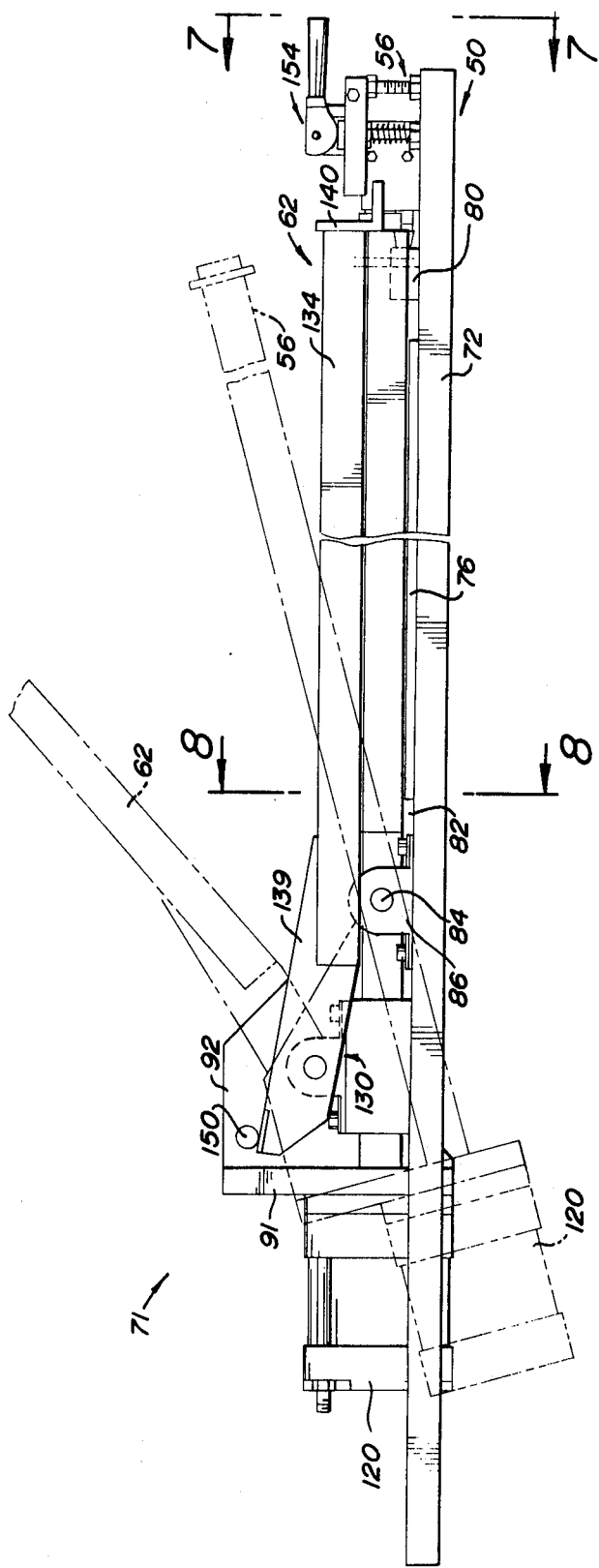
FIG. 6 is a side elevational view of a platen clamp assembly used for maintaining the component parts of the anode assembly in the proper relationship during the welding operation.
Figure 7:
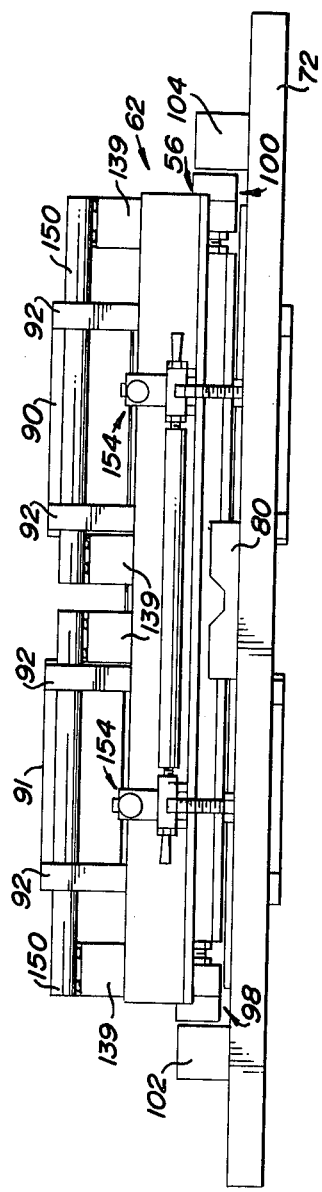
FIG. 7 is an end view of the apparatus shown in FIG. 6 (the view is taken on line 7—7 of FIG. 6)
Figure 8:
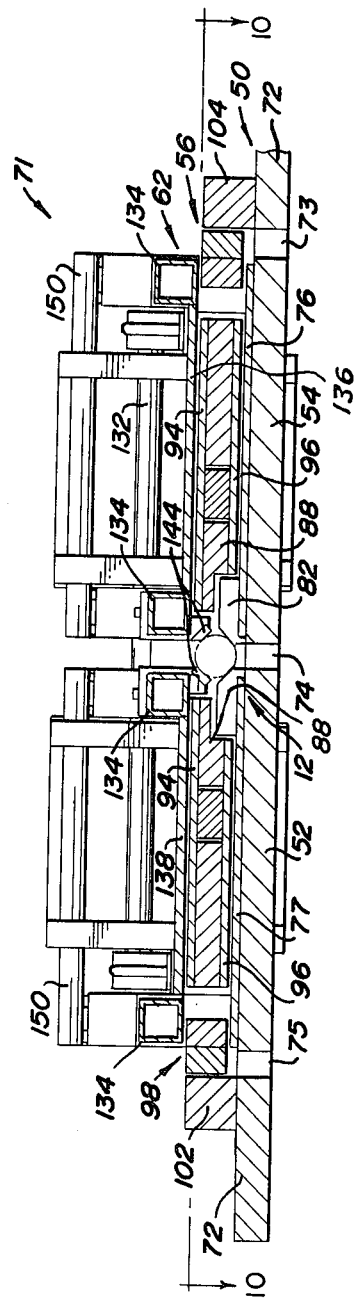
FIG. 8 is a cross-sectional view taken on line 8—8 of FIG. 6.
Figure 10:
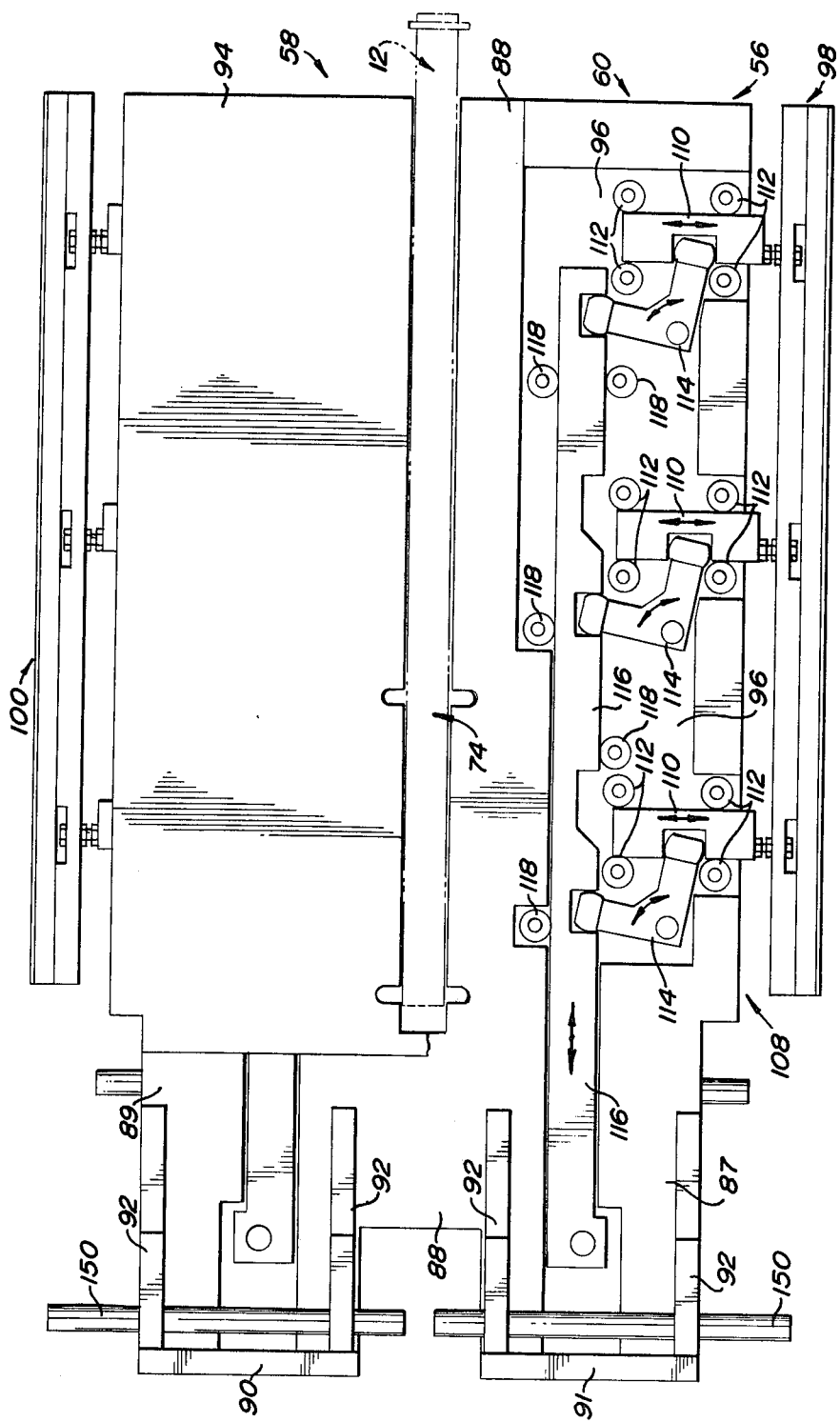
FIG. 10 is a cross-sectional view taken on line 10—10 of FIG. 7.

As best shown in FIGS. 6, 8 and 10, the intermediate platen unit 56 is carried from plate 72 for pivotal movement about an axis 84. As shown, the intermediate platen unit 56 is carried by suitable bearings 86 connected to the plate member 72 (see FIG. 10). Broadly, intermediate plate unit 56 is arranged so as to define the two separate plate members 58 and 60 discussed with reference to the sequence of operations described in FIG. 4A. Specifically, the embodiment shown comprises relatively heavy intermediate support plates 87, 88 and 89 connected at their left-hand end by vertical plates 90, 91 and braces 92 (see FIG. 6). The center one 88 of the intermediate support plates includes a longitudinally-extending groove sized so as to freely receive the anode member 12. The upper and lower surfaces of the platen members 58 and 60 are defined by upper and lower plates 94 and 96, respectively, which are positively connected to the intermediate support members 87-89.

Carried by the intermediate platen unit 56 are a pair of laterally movable clamp bars 98 and 100. The clamp bars 98 and 100 are arranged to clamp the leg portions 36, 36' of the sheets against fixed stop members 102 and 104 carried on the plate member 72 (see FIG. 8). In addition to performing a clamp function, the bars 98 and 100 serve as conductors between the outer sets of electrodes 68 and 70 during the welding operation. For this reason, the outer portions of the clamp bars are preferably formed from a suitable high conductivity material such as copper.

Figure 9:
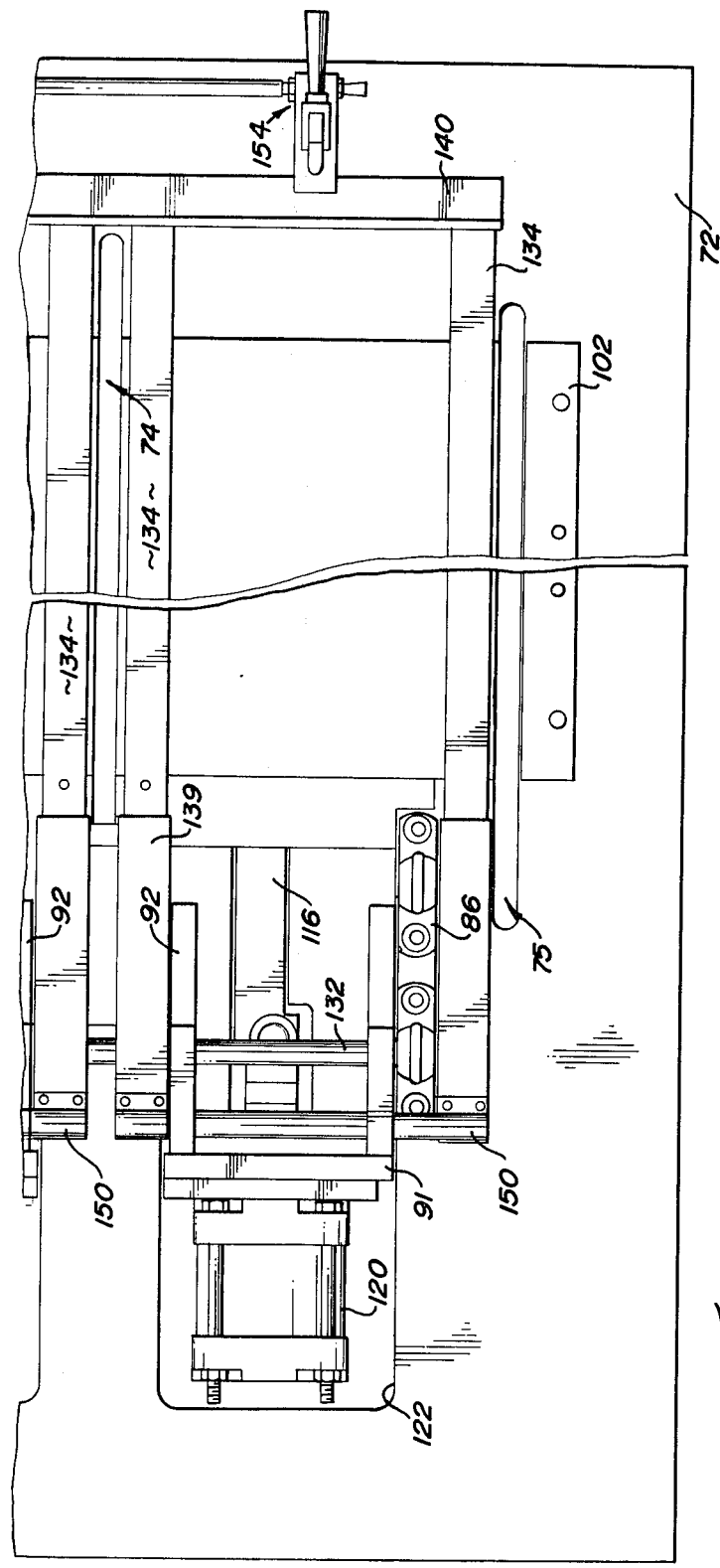
FIG. 9 is a partial plan view of the apparatus shown in FIG. 6.

The means for actuating the clamp bars 98 and 100 could be of many types. However, as best shown in FIG. 10, the subject embodiment utilizes a bell crank-type drive mechanism 108 for actuating the clamp bar 98. A substantially identical, but mirror image drive mechanism (not shown), is used for clamp bar 100. The description of mechanism 108 is to be taken as equally applicable to the mechanism which drives clamp bar 100. Specifically, the clamp bar 98 is carried at the outer ends of three slide blocks 110 which are mounted for guided reciprocatory movement between suitable sets of guide rollers 112 positioned between the upper and lower plates 94, 96. The slide bars 110 are driven simultaneously by three separate bell cranks 114 pivotally mounted between the upper and lower plates 94, 96. Movement of the bell cranks 114 is accomplished by a longitudinally positioned drive bar 116 guided for movement by rollers 118. The left-hand end of the drive bar 116 is connected with the piston rod of a fluid cylinder 120 carried on plate 91. As best illustrated in FIGS. 6 and 9, the support plate 72 is cut out as shown at 122 to permit the cylinder 120 to swing through the support plate to the dotted line position of FIG. 6. In this position, the various platen units are separated, as will subsequently be described, so that the components of the anode assemblies can be put into position for welding and removed following the welding operation. As previously mentioned, the clamp bar 100 is driven and actuated outwardly in the same manner as clamp bar 98 but by a separate fluid cylinder 121.

Referring to FIGS. 6 and 9, it will be seen that the upper platen unit 62 is also mounted for pivotal movement from base plate 72. As shown, suitable bearings 130 are connected to base plate 72 and receive a shaft 132 which extends transversely of the assembly. It should be appreciated that arcuate grooves are formed in the plates 92 so that pivotal movement of the intermediate or middle platen unit 56 can take place. The preferred construction for the upper platen assembly 62 can best be seen in FIGS. 6, 8 and 9. In general, plate assembly 62 includes four longitudinally extending rectangular bars 134. The two center bars 134 are spaced apart a distance sufficient to provide access for the upper electrodes of the center electrode set 69. The two separate platen members 64, 66 are defined by plates 136 and 138 which extend between the bars 134. At the left-hand end (as viewed in FIGS. 6 and 9) suitable bracket plates 139 extend outwardly from the bars and receive the shaft 132. Across the right-hand end of bars 134, an angle member 140 is welded or otherwise positively joined to rigidly connect them. Referring to FIG. 8, it will be noted that the center two bars 134 include guide or positioning blocks 144 which engage the upper half of the anode riser 12 to maintain in proper position in combination with the previously-mentioned locating blocks 82 and 80.

The intermediate and upper platen units 56 and 62 are interrelated so that they will swing to the dotted line position of FIG. 6 for loading and removal of the anode assemblies. Note that a bar member 150 extends through the brace plates 92 of platen unit 56. Bar 150 is positioned so that it engages the left-hand end of plates 139 of platen assembly 62. Thus, when platen unit 62 is swung to its lowered or closed position, the ends of the members 139 engage the bar causing the intermediate platen 56 to be swung to its closed position. Conversely, upon opening of the platen assembly, the intermediate 56 is permitted to swing to its dotted line position. The relationship of the bearings for the two platen units is such that when they are in the open position, they are separated as shown.

Many different means could be utilized for locking the platen assemblies in their engaged or clamping position. In the subject embodiment, a pair of cam clamps 154 are mounted on the right-hand end of plate member 72 and engage the lip of angle member 140 to clamp it in the closed position. The details of construction of the cam locks 154 form no particular part of the invention.

Figure 5:
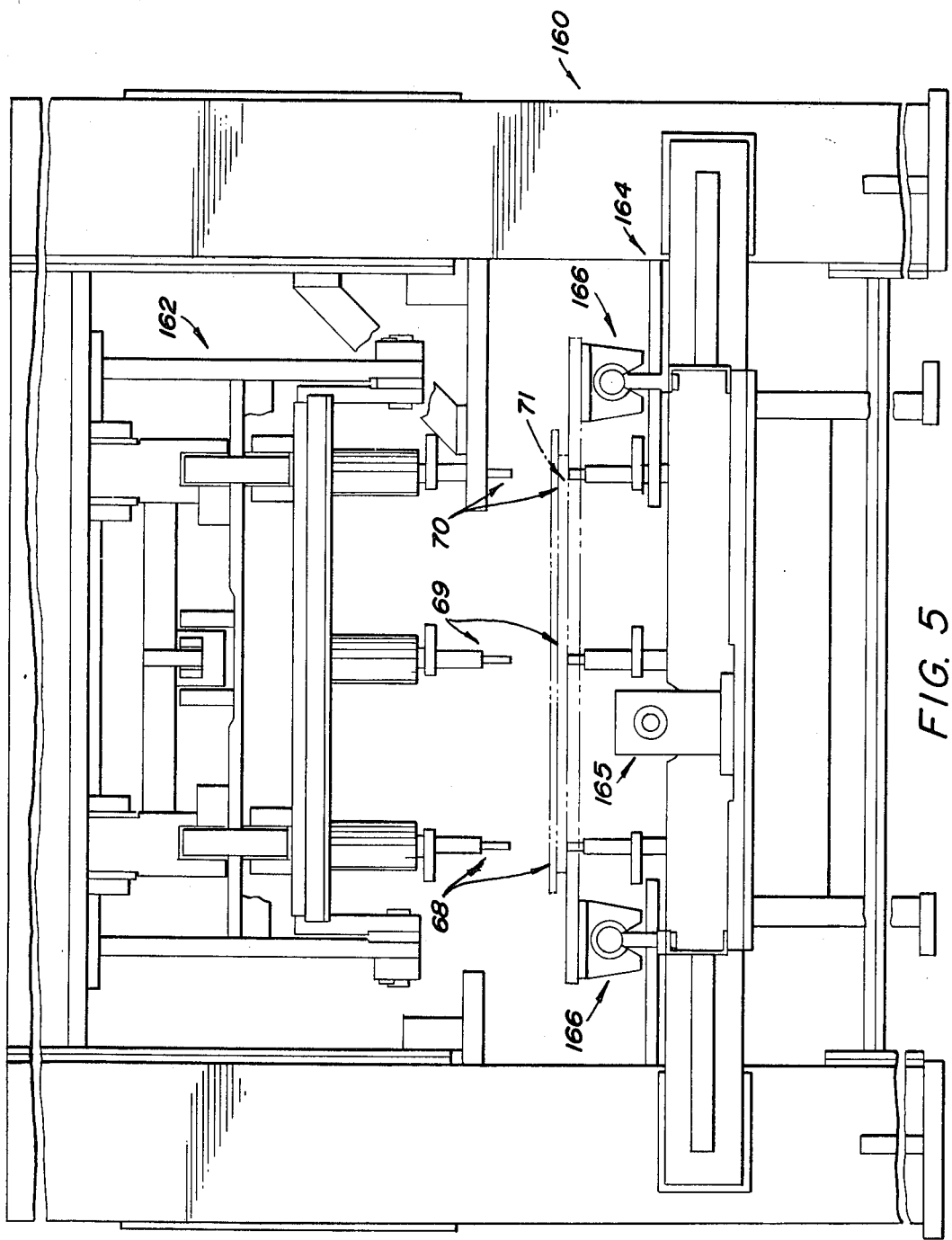
FIG. 5 is an elevational view showing a preferred welding apparatus for welding the anode assemblies of FIGS. 1-3.

The platen assembly described could be used with many different types of spot welding apparatus. FIG. 5 illustrates a spot welding press arrangement which is particularly suited for performing the necessary spot welding operations when using the subject assembly. As shown, the press includes a main frame 160 which supports a pivotal frame 162 carrying the upper ones of the electrode sets 68–70. The opposite ones of the electrode sets are carried from a base frame which is pivotally supported from frame 160. Associated with the base 164 is a conventional ball-type drive screw unit 165 and guide rails 166 on which the support plate 72 is carried. By indexing the drive screw members, the plate assembly is to have required movement past the welding electrodes. It should, of course, be appreciated that conventional controls are provided to interrelate the indexed movement of the platen assembly with the reciprocatory movement of the welding electrodes.

As is the current practice, the major components of the anode assemblies are formed from titanium having an oxide coating. Substantial difficulties are generally encountered in attempting to obtain a good weld between such titanium components. Accordingly, a further aspect of the invention concerns the required time, temperature, and pressure exerted by the welding electrodes.

To explain the overall functioning and use of the welding apparatus and the clamping platen assembly, reference is made to FIGS. 6 and 8. To load the clamping platen assembly, the cam clamps 154 are released and the intermediate and upper platen assemblies 56 and 62, respectively, are moved to the open or dotted line position. At this time, a sheet 28 is placed in location on the lower platen unit 50, and an anode riser 12 positioned in the locating blocks 80, 82. A sheet 40 is thereafter positioned on the upper side of the intermediate platen unit 56. It should be understood that the clamp bars 98 and 100 are in their retracted position and the leg and tab portions of the sheets are oriented as described with reference to FIGS. 1–3.

After the components have been properly positioned, the platen units are closed and the cam clamps 154 closed. At this time, the clamp bars 98, 100 are actuated outwardly to clamp the leg portions of the sheets against the fixed stops 102, 104. Thereafter, the welding can take place.

As mentioned earlier, time, temperature or current, and the pressure are relatively critical when spot welding the titanium sheets. As an example, in forming the subject assembly in which the sheets are 0.070 inch thick titanium expanded metal sheet and the riser has a copper core and a titanium coating with an outer diameter of 1¼ inches, extremely good weld joints have been achieved using copper electrodes with a diameter of 1⅜ inches. Each of the electrode sets engage the assembly with a force in the range of 1,000 pounds to produce a contact pressure from 4,000 to 6,000 psi. Current in the range of 10,000 to 13,000 amps. at 6 to 10 volts is supplied to the engaged electrodes for 4 cycles or 4/60 of a second.

It should be understood that with varying thicknesses of sheet, variation in the parameters somewhat directly with thickness will be desirable. Additionally, because slight variations in current have the effect of producing substantial variations in weld quality for material of the same thickness, it has been found desirable to control the spot welding electrodes so that only one fires at any one instant so that the load on the current supply is comparatively constant. This can be accomplished with conventional controls and, accordingly, the means for accomplishing this have not been shown. It is also believed important that the welding proceed with all of the welding electrodes positioned in general alignment across the assembly and that they have the same movement relative to the assembly. This assures that the heating and the resulting thermal expansion forces within the assembly are constant across the width.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A method of forming a dimensionally stable anode for use in an electrolytic cell comprising the steps of:
   a. providing first and second sheets, each sheet having a major, generally planar, extent terminating in first and second edge portions, the second edge portion of each sheet comprising an integral leg portion bent to extend laterally from said planar extent and terminating in a tab portion extending generally parallel to said planar extent;
   b. providing a generally cylindrical anode riser member;
   c. positioning said pair of sheets in generally parallel relationship with the tab portion of the second edge portion of each sheet being parallel to, and in engagement with, the first edge portion of the other sheet and positioning said riser member to extend generally parallel to said first and second edge portions and between the major planar extent of said sheets to form an anode assembly;
   d. placing rigid platen members within the assembly to extend between the planar extents of the two sheets and between the leg portions and the riser member;
   e. clamping the assembly between rigid, planar, external platens positioned to leave exposed the first and second edge portions of each sheet and the external portions of the major planar extent of each sheet adjacent the riser; and, thereafter,
   f. joining the sheets to the riser and the second edge portion of each sheet to the first edge portion of the other sheet by welding.

2. The method as defined in claim 1 including welding by spot welding a close and relatively uniformly-spaced series of points along the assembly parallel to the riser.

3. The method as defined in claim 1 comprising the additional step of clamping said leg portions of each sheet against a rigid stop member prior to welding.

4. The method as defined in claim 1 wherein said welding is carried out by providing three sets of spot welding heads adapted to engage said assembly on opposite sides thereof, and progressively moving said electrodes and said assembly relative to one another to produce three rows of spot welding.

5. The method as defined in claim 4 wherein said sheets and said riser have at least the external surfaces thereof formed from titanium and wherein said sets of electrodes are engaged with said assembly at a pressure substantially above 1,000 pounds per square inch and wherein current is supplied to said electrodes in a range above 10,000 amps. at a voltage of above 5 volts.

6. The method as defined in claim 5 including the step of supplying current to said electrodes sequentially so that only one set of electrodes is producing a weld at any one instant.

* * * * *